United States Patent [19]
Groom et al.

[11] 3,789,511
[45] Feb. 5, 1974

[54] APPARATUS FOR SENSING A CURVATURE IN A CONDUIT

[75] Inventors: Jack J. Groom, Columbus, Ohio; Gary L. Kinzel, Lafayette, Ind.

[73] Assignee: Columbia Gas System Service Corporation, Wilmington, Del.

[22] Filed: Feb. 4, 1972

[21] Appl. No.: 223,671

Related U.S. Application Data

[63] Continuation-in-part of Ser. No. 12,961, Feb. 20, 1970.

[52] U.S. Cl. .................. 33/312, 33/366, 33/174 L, 73/151
[51] Int. Cl. ............................................. E21b 47/02
[58] Field of Search .. 33/174 N, 174 R, 178 F, 312, 33/313, 366, 178 R, 178 E; 73/151

[56] References Cited
UNITED STATES PATENTS

| | | | |
|---|---|---|---|
| 3,065,633 | 11/1962 | Lubinski | 33/312 |
| 3,571,937 | 3/1971 | Sears | 33/312 |
| 3,460,028 | 8/1969 | Beaver | 33/312 |
| 2,859,528 | 11/1958 | Grossman | 33/144 |
| 3,308,549 | 3/1967 | Porter | 33/312 |
| 3,591,924 | 7/1971 | Berg | 33/DIG. 13 |
| 3,121,954 | 2/1964 | Foster | 33/366 |
| 2,196,950 | 2/1940 | Potapenko | 33/312 |
| 3,541,853 | 11/1970 | Anderson | 73/178 R |
| 2,930,137 | 3/1960 | Arps | 33/312 |

*Primary Examiner*—John W. Huckert
*Assistant Examiner*—Jon W. Henry
*Attorney, Agent, or Firm*—Curtis, Morris & Safford; Harold L. Stults; Pasquale A. Razzano

[57] ABSTRACT

The change in slope of a bore, conduit or pipeline is determined by supporting a pair of pivotally interconnected rigid components in the bore with the ends of the components and the pivotal interconnection therebetween located on the centerline of the bore. The change in slope between the components at the pivotal interconnection therebetween is detected, and this change in slope, because of the manner in which the rigid components are connected, is the same as the change in slope of the bore or pipeline in which the rigid components are placed and is in proportion to the strain in the surrounding pipeline. Apparatus is provided for determining the change of slope in a bore, in this manner, and is particularly adapted for use in pipelines being laid or retrieved.

29 Claims, 13 Drawing Figures

APPARATUS FOR SENSING A CURVATURE IN A CONDUIT

This application is a continuation-in-part of our copending U.S. Pat. application Ser. No. 12,961, filed Feb. 20, 1970, the disclosure of which is incorporated herein by reference.

The present invention relates to methods and apparatus for testing conduits and pipelines and more particularly, to an apparatus for determining the curvature and strain of a pipeline as it is being laid or retrieved.

In the laying of conduits on marine bottoms which vary in depth, controlling the curvature of the conduit to avoid excessive stress and strain therein is essential. The stress and strain to which the conduit or pipeline is subjected in such operations is determinative of the size of the pipe wall that must be used and sizes of these pipes are normally determined by the laying contractors, based partially on experience. It has been found, however, that it is possible to use pipes for a pipeline that have a thinner wall section than heretofore has been provided, by controlling the curvature of the pipe during the laying operation so that excessive stresses and strains are avoided.

Excessive stresses and strains in a pipeline are normally developed by the curving of the pipe as it is laid on the ocean floor and therefore it is at this point at which it is critical that the stresses and strains be controlled. Since the stresses and strains are a function of the curvature of the pipe, a rapid detection of the amount of curvature, or of a parameter of the pipe which is a function of the curvature, will permit the operator of the pipeline laying equipment to make the necessary adjustments to reduce stress and strain in the pipeline during the laying operation.

After the laying operations are completed, pipelines or conduits on marine bottoms are often affected by storms, tides, and other forces. Similarly, pipelines or conduits in overland trenches are from time to time stressed by bending due to land settlement and earthquakes. Therefore, it is desirable to periodically inspect pipelines in service to determine whether there are curvatures or strains in the pipeline as a result of these forces, which are undesirable due to the likelihood of pipeline failure, excessive resistance to fluid flow, or other reasons.

Various techniques have been previously proposed for sensing pipeline curvatures, including devices mounted on the outside of the pipeline for transmitting signals to the conduit laying vessel. Strain gages have also been applied to the pipeline sections as they are being laid, but such gages only provide information reflective of the stress at the section of the pipeline to which they are secured. Moreover, such gages are not readily movable along the pipeline, in order to sense strain in other sections, and to apply such gages to all sections of a pipeline as it is being laid is a relatively expensive and time consuming operation. Accordingly, none of these previously proposed external techniques has been found to be satisfactorily applied to pipelines, particularly to pipelines being placed into service on marine bottoms or in filled in pipeline trenches where the pipeline is not readily physically observed.

Accordingly, it is an object of the present invention to determine the curvature and strain in a pipeline from a remote location by taking measurements along the interior of the pipeline.

A further object of the present invention is to accurately determine the curvature in a pipeline by a method which is relatively simple in operation and which can be performed within the interior of the pipeline.

A still further object of the present invention is to measure the curvature and strain at a plurality of locations in a pipeline with a device which can be readily moved within the pipeline.

Another object of the present invention is to provide an apparatus for measuring the change in slope or curvature of a pipeline, which apparatus is relatively simple in construction and inexpensive in operation.

In accordance with an aspect of the present invention the change of slope, curvature and strain in a conduit or pipeline is determined by a method and apparatus in which a pair of elongated rigid components are interconnected by a universal joint and supported in the conduit or pipeline with free end portions of the rigid components and the universal joint located concentrically of the pipeline with the center of the component ends and the center of the universal joint on the centerline of the pipeline. A flexible strain rod is rigidly secured to the components, with the rod extending through the universal joint therebetween. As a result of this arrangement, any change in slope between the rigid components at the universal joint is equal to the change in slope of the pipeline and the change in slope of the strain rod, while substantially all bending stresses at the universal joint, caused by the relative pivotal movement between the components, occurs in the rod. This strain is proportional to the change in slope of the rod and thus of the rigid components and the pipeline, and also is proportional to the strain in the pipeline. A detecting device, for example one or more strain gages, is provided for determining the strain in the rod at the universal joint so that one device, detecting strain in the rod, simultaneously detects the change in slope of the pipeline and the strain therein.

The above, and other objects, features and advantages of this invention will be apparent in the following detailed description of an illustrative embodiment thereof, which is to be read in connection with the accompanying drawings, wherein:

FIG. 11 is a sectional view taken along line 11—11 of FIG. 10; and

Figure 1:
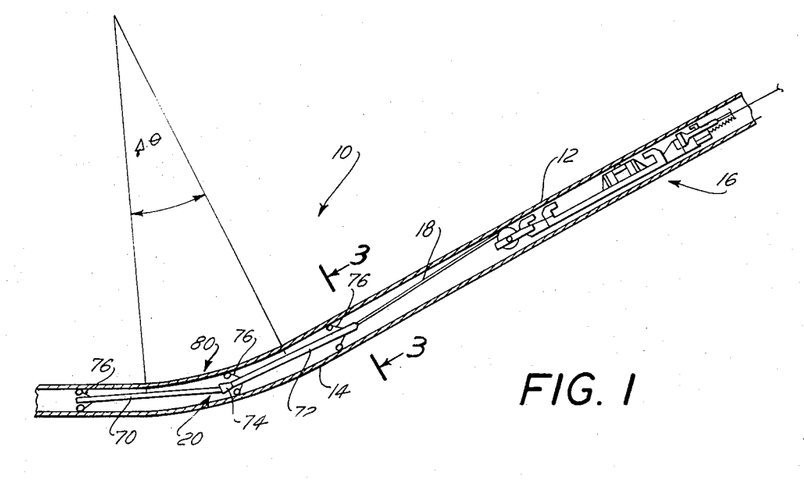
FIG. 1 is a schematic sectional elevational view of a device for determining the change in slope and strain in a pipeline, according to an embodiment of the present invention, and illustrates the configuration of the apparatus when positioned in a bend in a pipeline.

Referring to the drawings in detail, and initially to FIG. 1 thereof, a pipeline curvature sensor device 10, embodying the present invention, as shown therein, is positioned within a pipeline 12 having a curved section 14, the curvature and strain of which is to be determined. Sensor device 10 includes a traction unit 16 connected through a cable 18 to a sensor unit 20 which is constructed to determine the change in slope of the pipeline, as more fully described hereinafter, and thus the curvature and strain in the pipeline itself. Traction unit 16 is utilized to draw sensor unit 20 through pipeline 12 and locate the sensor unit at predetermined positions in the pipeline, at which the curvature of the pipeline is to be checked.

Typically, the pipeline is laid in sections from a ship or barge on which lengths of pipe are welded to the free end of the pipeline. Traction unit 16 will normally be located at a predetermined location in the pipeline, i.e., at a joint or adjacent the free end of the pipeline, with sensor unit 20 drawn behind it by cable 18, the latter being let out a predetermined distance. As a result, the exact location of sensor unit 20 will be known. When a new pipeline section is welded to the free end of the pipeline, sensor 20 is drawn up by cable 18, as described hereinafter, to a position adjacent the traction unit, then tractor 16 is operated so that it moves to its next predetermined position, e.g., the next joint in the pipeline, or the end of the newly welded pipeline section, while cable 18 is let out at the same rate as the tractor's speed of motion, so that the sensor is held in the position to which it has previously been moved. Since the distance that cable 18 will have been let out can be measured by a conventional counter operatively connected to the reel on which the cable is wound, the exact location of the sensor unit 20 in the pipeline is known.

Figure 2:
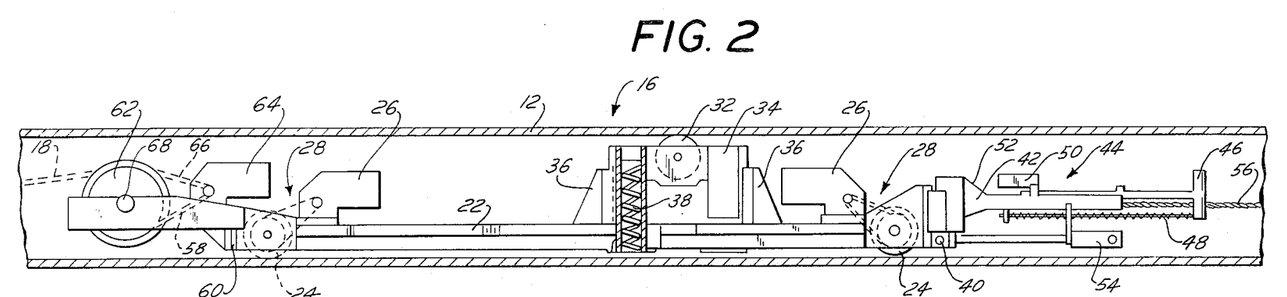
FIG. 2 is an enlarged elevational view of the tractor portion of the apparatus positioned in a pipeline.
Figure 2:
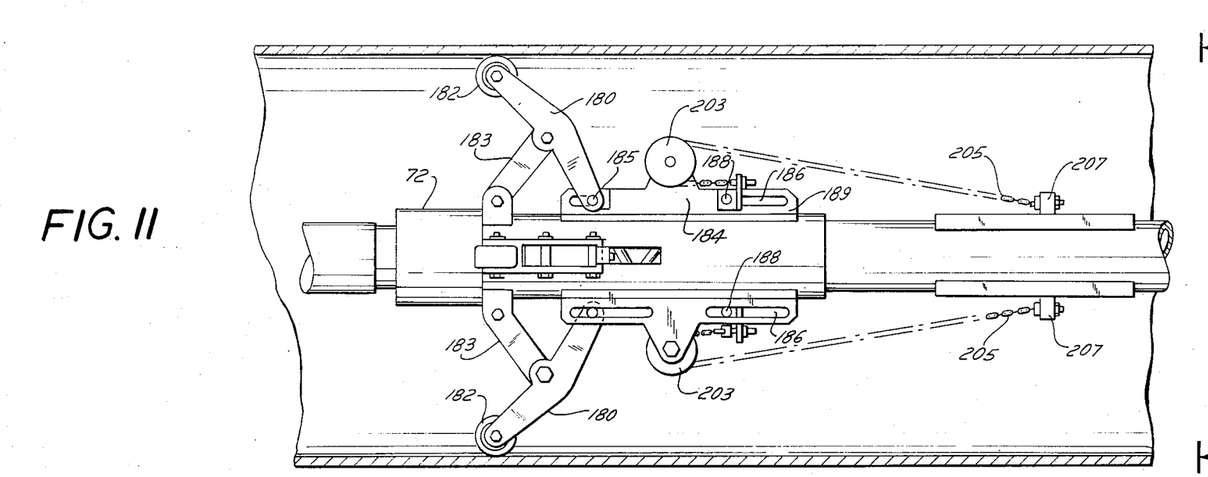

Referring to FIG. 2, traction unit 16, which is illustrated as being positioned within pipeline 12, includes a frame 22 supported by a pair of traction wheels 24 which ride on and frictionally engage the inside wall of the pipeline. Wheels 24 are each driven by independent drive units or motors 26 through conventional sprocket and chain transmissions 28.

An additional wheel arrangement 30 is provided on the side of frame 22 opposite wheels 24 and includes a wheel 32 rotatably supported in a carriage 34. The latter is slidably mounted on carriage guides 36 for movement in a vertical direction with respect to frame 22 and is biased upwardly by a pair of coil springs 38 acting at opposite ends thereof between the carriage 34 and frame 22. Suitable circuitry (not shown) leads to the laying vessel or barge to provide signals to the operator for controlling drive units 12 from that remove position. Alternatively, the units may be controlled by a control unit positioned on the traction unit.

The forward end 40 of tractor frame 22 is provided with an elongated arm 42 rigidly secured thereto and extending forwardly towards the free end of the pipeline. Arm 42 provides a housing which supports a switch arrangement 44 that includes a ram 46 mounted for sliding movement in the arm. A spring 48 urges ram 46 outwardly of tractor unit 16. When ram 46 contacts an obstruction in the conduit, such as other pipeline equipment, it is moved to the left (as viewed in FIG. 2) until a switch arm 50 secured thereto engages the sloping portion 52 of arm 42 to close the switch 44 and stop drive units 12. An emergency tow bar 54 is connected to frame 22, and arm 42, in the event that the connection between the cable 56, connecting arm 42 to the ship, is broken.

A winch frame 58 is mounted at the rear end 60 of tractor frame 22 and rotatably supports a winch drum or reel 62 thereon. A winch drive motor 64 is connected to drum 62 by conventional chain and sprocket arrangement 66 for selectively driving the drum in a clockwise or counterclockwise direction in order to wind up and release the cable 18, connecting traction unit 16 to sensor unit 20. A conventional electronic counter or meter 68 may be operatively connected to the rotary support shaft of drum 62 in order to sense the number of rotations of the drum and thus the amount of cable 18 which has been played out therefrom so that the exact location of sensor unit 20 with respect to tractor 16 is known. Cable 56 connects tractor unit 16 to the ship and carries electrical control conduits for controlling drive motors 26, drive motor 64, and counter 68 from a remote location on the ship.

Sensor unit 20 is constructed from a pair of tandemly arranged elongate rigid sensor bars or components 70, 72, interconnected by a universal joint 74. Components 70, 72 are supported by a plurality of carriage members 76, as described hereinafter, to hold the components in a predetermined configuration within the pipeline, with the free ends of the components, and the universal joint 74, located on the centerline of the pipeline. In this configuration, a sensor device 80, located at universal joint 74, is adapted to determine the change in slope between the components 70, 72 and thus the change in slope in the pipeline.

It has been found that the average pipeline curvature between any two given points can be determined simply by determining the change in slope of the pipeline between the two specified points. Since the bending strain in a curved pipeline is directly proportional to its change in slope, the average laying stress or strain in a pipeline due to bending between the two points can be determined by measuring the slope change. Sensor device 80 of the present invention is constructed to take advantage of the direct proportion between the change in slope and the stress in a pipeline in order to determine the slope of the pipeline and the strain therein from a remote location.

Figure 7:
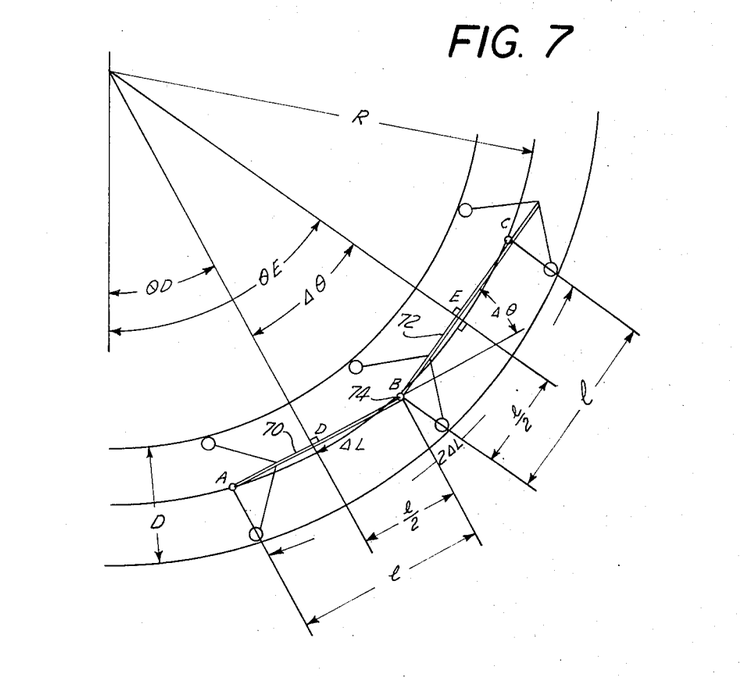
FIG. 7 is a diagrammatic illustration of the apparatus located in a curved portion of a pipeline and illustrating the geometry of the system utilized to determine the curvature and strain in the pipeline.
Figure 8:
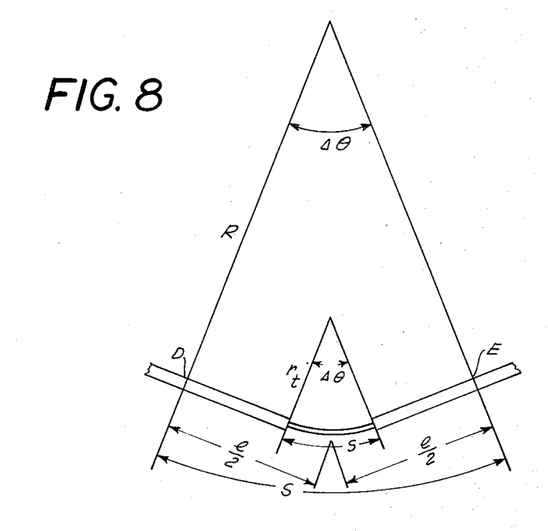
FIG. 8 is a diagrammatic illustration of the relationship between the radius curvature of the pipeline and the radius curvature of the sensing apparatus.

FIGS. 7 and 8 illustrate the general theory of operation of the sensor 20 of the present invention.

Figure 4A:
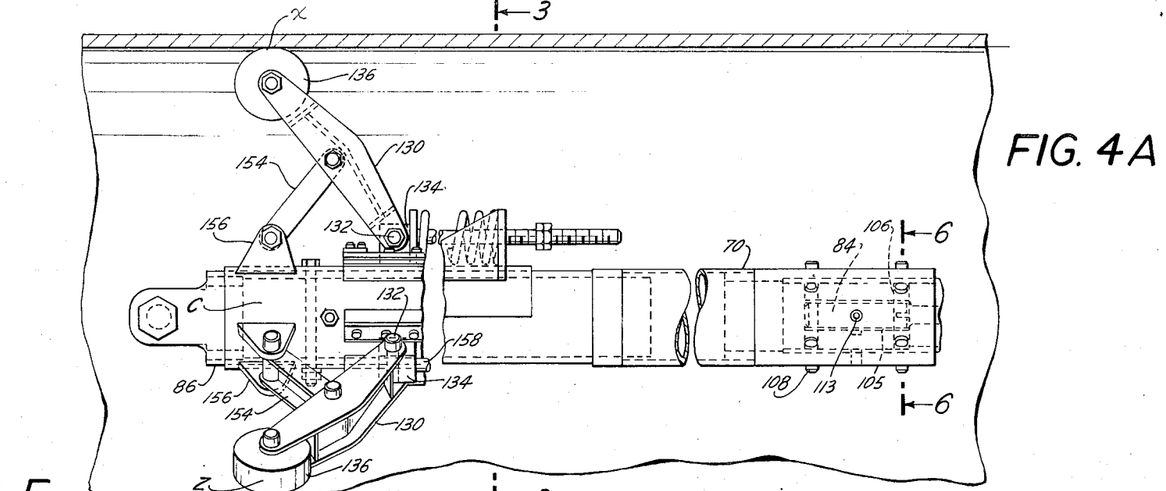
FIGS. 4A and 4B together, are a fragmentary elevational view, with parts broken away, taken along the line 4—4 of FIG. 3.
Figures 4B, 6:
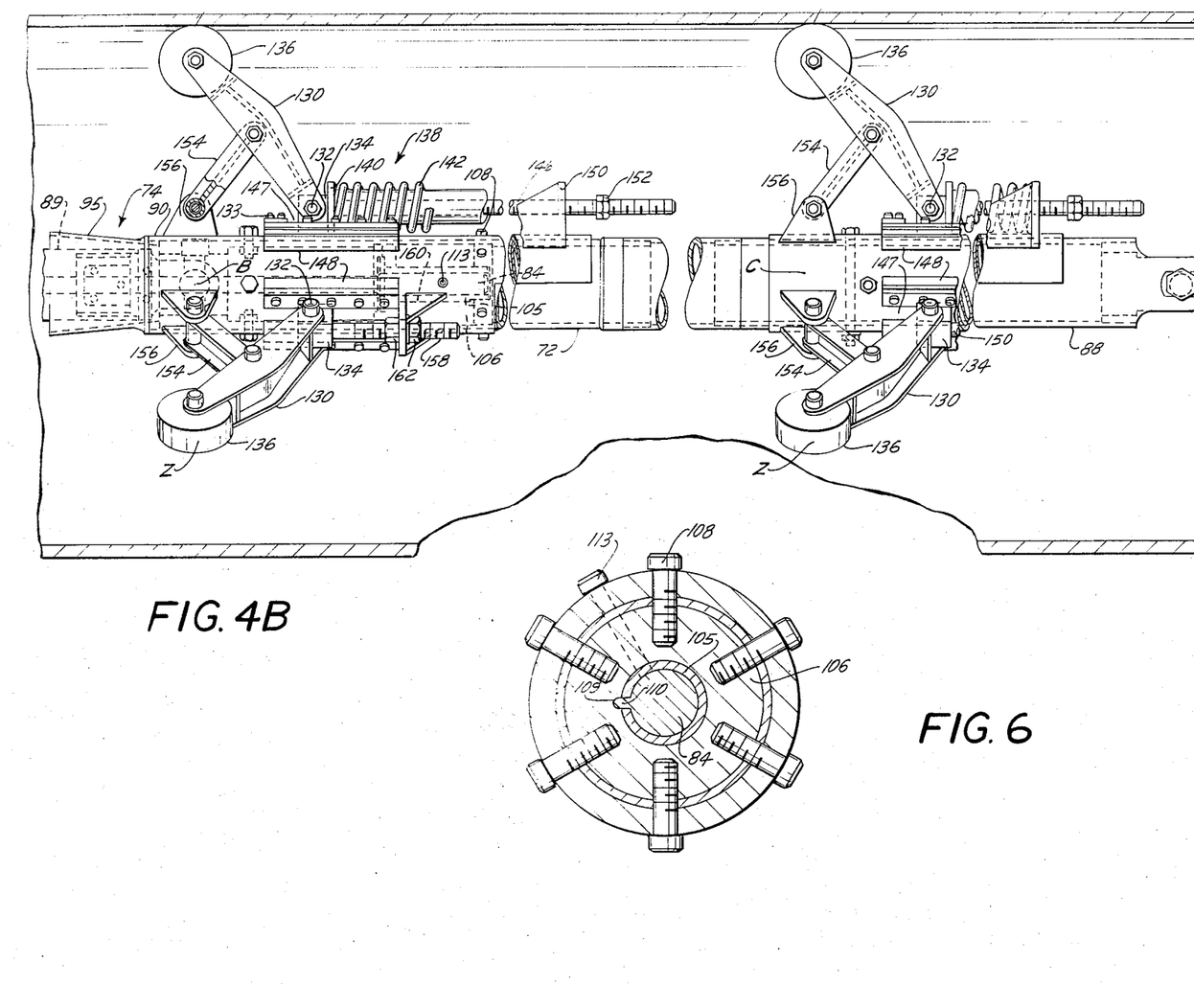
FIG. 6 is a sectional view taken along line 6—6 of FIG. 4A.
Figure 5:
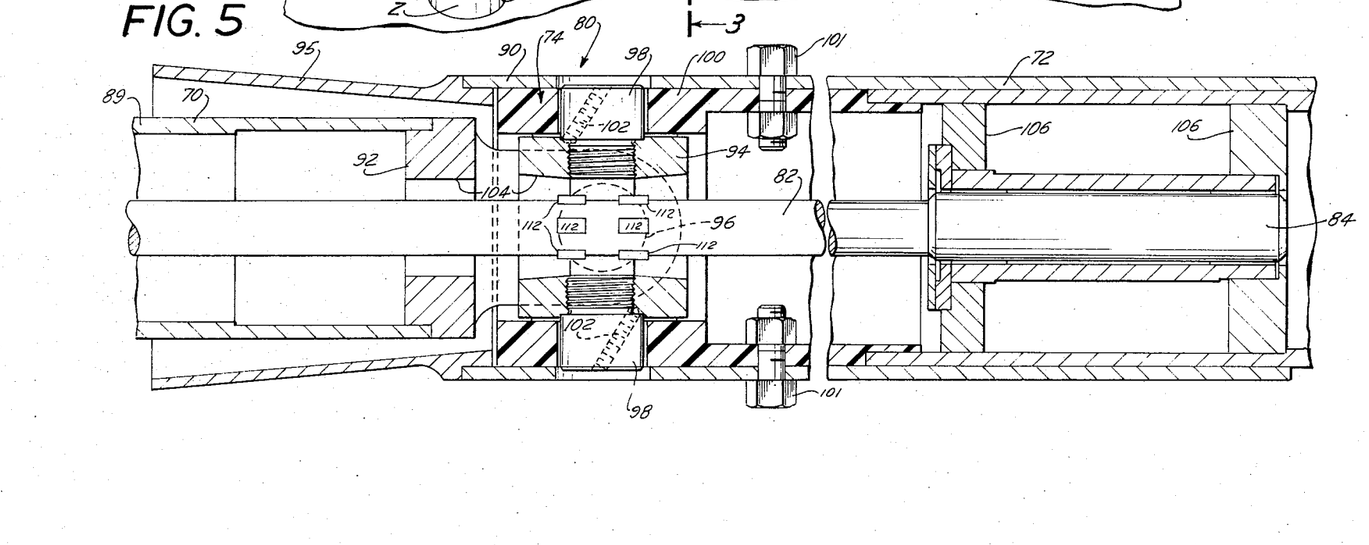
FIG. 5 is an enlarged sectional view of the universal joint connection between the rigid components of the apparatus.

Sensor device 80, as seen in FIGS. 4 and 5, includes an elongated flexible strain beam or rod 82 tightly supported at its ends 84 within components 70, 72, as more fully described hereinafter, and extends directly through the center of the univeral joint 74. A plurality of strain gages placed on the rod at the universal joint are adapted to determine the strain on the rod at that point. Since components 70, 72 are connected by universal joint 74, all of the strain at the universal joint will be taken up in flexible rod 82 and this strain is proportional to the change in slope between components 70, 72 and the curved portion of the pipeline. As shown hereinafter, the change in slope between these components is the same as the change in slope of the surrounding pipeline.

Referring now to FIGS. 7 and 8, the various relationships between components 70, 72, pipeline 12 and sensor 80 are diagrammatically illustrated to facilitate explanation of the general theory of operation of the invention.

Generally, the accepted equation relating change in slope and average bending strain is, $$e_{AV} = D\Delta\theta/2\Delta L \tag{1}$$

where:
$D$ = diameter of the pipe
$\Delta L$ = change in distance along the pipe length
$\Delta\theta$ = change in angle in the length $\Delta L$
$e_{AV}$ = average bending strain.

This equation forms the basis of the theory of operation of the invention and the various parameters used therein are shown in FIG. 7. The latter is a sketch of sensor unit 20 and is utilized to illustrate the relationship between bending strain and change in slope of the pipeline and of the rigid components 70, 72.

The two rigid components 70, 72 of sensor 20 each have an equal length $l$ measured between the hinge or flexible universal joint 74 and the points A, C located adjacent the carriage members 76 supporting the free ends of the components. Flexible rod 82 passes through the center of universal joint 74, at point B, at which point the change in slope between rods 70, 72 is measured and which is equidistant from points A and C.

If pipeline 12 is assumed to have a constant radius of curvature R over a short section $2\Delta L$, then the average slopes between points AB and BC become identical to the slopes $\theta_D$ and $\theta_E$ tangent to the centerline of the pipeline at points D and E located a distance one-half $l$ from points A and B respectively. Hence, the change in slope $\Delta\theta$ of pipeline 12 over the section $2\Delta L$ becomes:

$$\Delta\theta = \theta_E - \theta_D \tag{2}$$

where:
$\theta_D$ = slope tangent to point D
$\theta_E$ = slope tangent to point E.

From FIG. 7 it is seen that the components 70, 72 whose points A, B, which are supported on the centerline of the pipeline, at points A, B and C, would extend parallel to the tangents of the centerline of the pipeline at points D and E so that the angle $\Delta\theta$ formed therebetween equals the change in slope between the components and also the change in slope of the pipeline itself, according to the proof set forth above.

Because the maximum change in slope to be encountered is less than 10°, the following assumption can be made:

$$\Delta L = l \tag{3}$$

where: $l$ = the length between points AB or BC which, as mentioned above, are equal.

Accordingly, by substituting equation (3) into equation (1):

$$e_{AV} = D\Delta\theta/2l \tag{4}$$

The determination of the bending stress in pipe 12 can thus be found by applying the strain of equation (4) to a stress-strain curve of the pipe material. For strains in the elastic region of this curve, the average bending stress can be determined by the equation:

$$\nabla_{AV} = e_{AV}E \tag{4a}$$

where: $E$ = modulus of elasticity of the pipeline material.

In order to measure this stress, flexible strain rod 82 is utilized to absorb the bending stress at universal joint 74 between rigid components 70, 72. The relationship of the rod 80 to the radius of curvature R of the pipeline is schematically illustrated in FIG. 8.

Strain gages secured to the rod at the universal joint detect the strain of the beam in accordance with the following relation of the beam parameters.

$$r_t = C_t/e_t \tag{5}$$

where:
$C_t$ = one-half of the beam thickness
$r_t$ = radius of curvature of the beam
$e_t$ = strain read by the gage.

Because the flexible rod 82 has its ends supported in the rigid elements 70, 72, which in turn, are supported with points A, B, C on the centerline of the pipeline, the radius of curvature of beam 82 and the radius of curvature of the pipeline, along with their arc lengths are directly proportional. Hence:

$$R = (S\, r_t)/s \tag{6}$$

where:
$R$ = the radius of curvature of the pipe
$S$ = the arc length ($l$) of the pipe
$r_t$ = the radius of curvature of the beam
$s$ = the arc length of the beam (i.e., the flexible length of the beam).

Since:

$$\sin \Delta\theta = \Delta L/R \tag{7}$$

and since the angle $\Delta\theta$ will be relatively small so that the sine thereof will substantially equal the angle, it can be said that:

$$\Delta\theta = \Delta L/R \tag{8}$$

Substituting equation 8 into equation (4) it is seen that:

$$e_{AV} = D/2R \tag{9}$$

By substituting the equation (5) into equation (6) and then utilizing the resulting equation for $R$ in equation (9), the following equation is developed: $e_{AV} = (e_t/2)(D/S)(s/C_t)$    (10)

From this equation it is seen that the average strain in pipeline 12 is thus a function of the strain in beam 82 and the known parameters, that is, pipe diameter ($D$), one-half the beam thickness $C_t$, length $l$, and the arc length $s$ of the beam.

With this arrangement, the sensitivity of the system can be altered easily by varying the $s/C_t$ ratio. Because the sensitivity of the device can be made sufficiently high by variation of this ratio, errors normally associated with strain gages can be made sufficiently low so that the system produces accurate indications of the strain in the pipeline.

In order to monitor bending of pipeline 12 about any axis in the transverse plane, strain gages are mounted on beam 82 in planes at 90° to one another. Because the hinge between the rigid bars is a universal joint, all the bending strain at this point occurs in the strain gage beam. Thus, the strain gage outputs constitute orthogonal components of the maximum bending strain. The relationship to the gage indicated strain, $e_t$ used in equation (10) then would be:

$$e_t = \sqrt{(e_{A-ave})^2 + (e_{B-ave})^2}$$   (11)

where:

$e_{A-ave}$ = strain reading of gages mounted in bending plane A $e_{B-ave}$ = strain reading of gages mounted in bending plane B, which is 90° from plane A.

From the above equations it is seen that a variety of information can be provided by sensor unit 20 of the present invention. In particular, the change of slope between rigid components 70, 72 and the change in slope of the curved portion of the pipeline in which the sensor is placed can be determined, as can be the radius of curvature of the pipeline, the strain in beam 82, and the strain in the pipeline itself.

The construction of a preferred embodiment of sensor 20 for carrying out the sensing operation described above, is illustrated in detail in FIGS. 3-6. As shown therein, components 70, 72 are generally cylindrical tubular members having free end portions 86, 88 respectively, and adjacent end portions 89, 90 interconnected by universal joint 74. As seen in FIG. 5, universal joint 74 includes a yoke 92 rigidly connected to end 89 of component 70 and an annular collar 94 pivotally mounted in yoke 92 by pins 96. Yoke 92 is in turn pivotally mounted in end 90 of tube or component 72 by a pair of pins 98 rotatably positioned in an annular bearing member 100 rigidly secured to the inner surface of component 72 by bolts 101. Pins 98 are fixed to collar 94 by set screws 102. Universal joint 74 is hollow, i.e., yoke 92 and collar 94 each have axially aligned central passageways 104 formed therein, to permit passage of strain rod or beam 82 therethrough. In addition, component 72 has a frustoconical collar 95 secured thereto and surrounding end 89 of component 70. Collar 95 opens towards component 70 and serves to limit the amount of relative pivotal movement permitted about universal joint 74. Preferably, this movement is limited to about 10°.

Beam 82 has a predetermined flexible length $s$, between its enlarged end portions 84. The latter are rigidly mounted in components 70, 72 respectively, so that they are located at equal distances from the center of the universal joint, as defined by the intersection of pins 96, 98. Ends 84, as seen in FIG. 6, are seated in annular bushings 105 and are secured in annular collars 106, with the latter being rigidly connected in a fixed position to its associated tubular member 70, 72 by a plurality of bolts 108 extending through the tubular member and into the collar. Collars 106 have keyway passages 109 formed therein and the ends 84 of rod 82 have complementary keys 110 adapted to be received in the keyways 109. Since the strain gages mounted on rod 82 are positioned at 90° from each other, as described above, (these gages are legend with the numerals 112 in the drawing) the keyway arrangement assures that the relative angular position of rod 82 and thus of the strain gages, with respect to the components 70, 72 is fixed and remains fixed throughout operation of the device. Moreover, the ends 84 of sensor rod 82 are secured in bushings 105 against relative axial movement by one or more set screws 113 secured in the collar against the rod.

As components 70, 72 can bend with respect to each other in all directions, the fixed position of gages 112 with respect thereto is critical because it enables the operator to determine, from a remote location, in which direction the pipes are bent.

Figure 3:
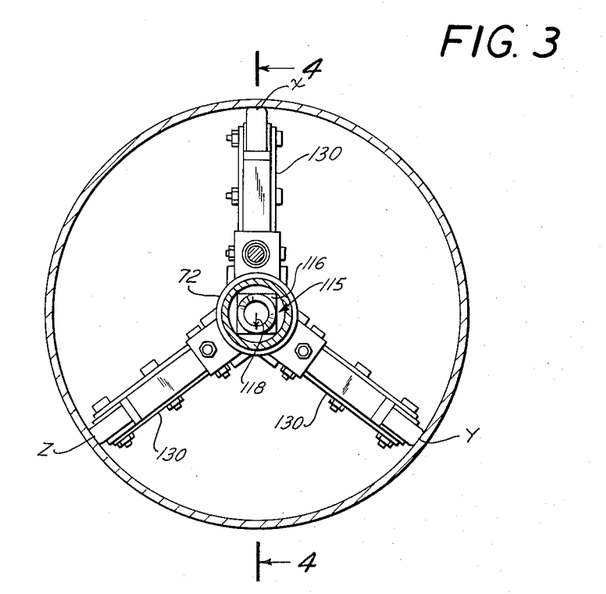
FIG. 3 is an enlarged sectional view taken along line 3—3 of FIG. 1.

In order to determine the relative configuration of components 70, 72 in pipeline 12, from a remote location, and thus to determine in which direction the pipeline itself is bent with respect to the horizontal and vertical planes, one of the components 70, 72 as seen in FIG. 3, is provided with a gravity responsive sensing device 115. The latter, in the illustrative embodiment of the invention, as shown in FIG. 3, is secured in component 72. The sensor comprises an annular variable resistance potentiometer 115 and a gravity responsive slide contact 118. The resistance of potentiometer 116 increases from a first predetermined value to a final increased value 360° away. The potentiometer is mounted in the component 72 so that when the device is in the configuration illustrated in FIG. 3, gravity actuated slide 118 will point directly downwardly and contact the potentiometer at the first resistance value to product a signal voltage indicative of this configuration of the device. Should sensor unit 20 rotate in pipeline 12 so that the configuration thereof with respect to the pipeline changes from that illustrated in FIG. 3, slide contact 118 will remain pointed downwardly, under the influence of gravity, while the potentiometer 116 rotates with respect thereto. Each point of contact of slide 118 with the potentiometer will produce a different signal voltage which will provide the operator with information as to the configuration of the sensor. As a result of this information, the operator can determine the location of the two planes in which strain in gages 112 are located and thus also can determine in which direction the components are bent with respect to each other. From this information, it is clear that the operator can determine the horizontal and vertical direction of bend in the pipeline.

Figure 9:
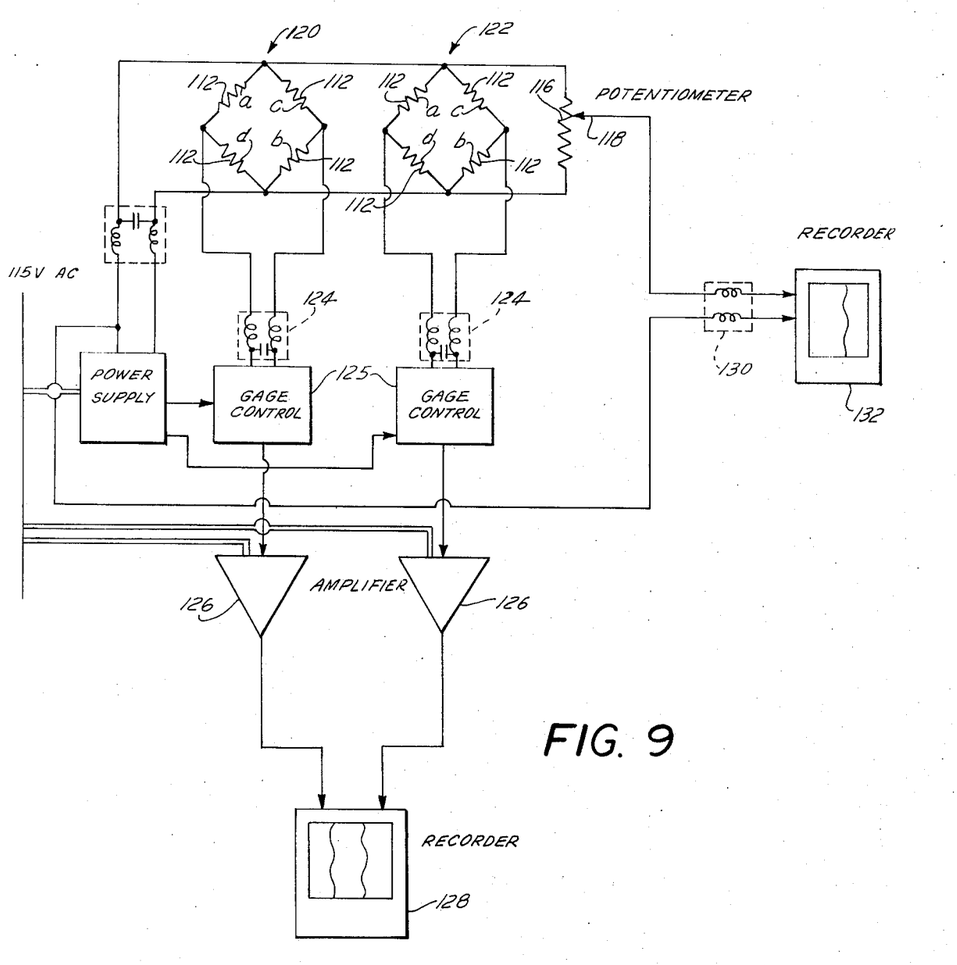
FIG. 9 is a circuit diagram illustrating the operation of the strain detecting means of the present invention.

The information supplied by strain gages 112 and potentiometer 116 are transmitted through cables 18 and 56 to the ship or pipe laying barge. In preferred embodiment of the present invention, four strain gages are secured to rod 82 in each of the selected planes, with two of the strain gages in each plane located on opposite sides of the rod. The four strain gages in each group, as illustrated in FIG. 9, are interconnected in separate bridges 120 and 122. For example, bridge 120, illustrates the interconnection of the four gages 112 mounted on opposite sides of bar 82 along the horizontal plane, while bridge 122 represents the interconnection of the strain gages 112 located in the vertical plane on rod 82. The gages $a$, $b$ are located on one side of the rod and the gages $c$, $d$ are located on the opposite side thereof.

Power is supplied to the circuit of FIG. 9 from a conventional AC source and strain in rod 82 will cause the resistances $a$–$d$ in each of bridges 120 and 122 to vary so as to produce a varying output voltage or current which is proportional to the resistance detected. The signals produced by gages 112, pass through filters 124 and conventional gage control apparatus 125 to amplifiers 126, and operate a recorder 128 of conventional construction. The latter provides a visual indication of the strains detected, as for example, by separately plotting the amplitudes of the two signals. In another embodiment of the invention the signals from amplifiers 126 may be passed through a conventional electronic circuit adapted to perform the calculation of equation (11) so as to produce a single visual output signal indicative of the maximum strain in the rod.

Potentiometer 116 is connected to the circuit, as illustrated in FIG. 9, and is connected through a filter 130 to a recorder 132, similar to recorder 128, which produces a visual indication of the signal sent by the potentiometer and thus an indication of the relative configuration of the sensor within the pipeline.

The construction of the carriage arrangements 76 utilized to support rod members 70, 72 is of critical importance in the present invention since, in order for sensor unit 20 to be accurately operated, it s critical that points A, B, and C of the sensor unit be supported on the centerline of the pipeline. When these points are supported on the centerline, as described above, the sensor will accurately determine the change in slope between the members 70, 72 and thus the strain in rod 82, the change in slope and curvature of the pipeline, and the strain therein.

To accomplish this purpose, each of the support or carriage members 76 includes three arm members 130 pivotally mounted at their inner ends 132 on movable blocks 134 and rotatably supporting rollers, or antifriction elements 136, at the opposite ends thereof. One of the arms 130 (the uppermost arm in FIGS. 3 and 4) of each of the carriage members has a slide unit 138 in which block 134 is rigidly connected to collar 140 and which unit includes a spring 142 surrounding a sleeve 144, and a threaded rod 146 extending through sleeve 144 and connected at one end to the collar 140. Block 134 and collar 140 are slidably mounted in a slot 147 formed in support block 148 secured to its associated component 70 or 72. Similarly, the blocks 134 of each of the other legs of each of the carriage members is slidably mounted in a similar slot 147 of the other blocks 148.

The free end of rod 146 extends through a stationary end bracket 150 and is threadably engaged with an adjusting nut 152 in order to pretension spring 142 prior to placement of the sensor unit in the pipeline 12. In this manner, one of the blocks 134 in each of the carriage members 76 is urged to the left by its associated spring 142, as seen in FIG. 4, to hold the wheel 136 associated therewith in frictional engagement with the pipeline's inner wall.

Each of the arms 130 is also secured to the bars 70, 72 by brace arms 154 pivotally connected between arms 130 and support blocks 156 on the tubular components in order to form a relatively stable triangulated leg member.

The blocks 134 of the other two arms 130 of each of the carriage members 76 are adjustably mounted in slots 147 by threaded rods 158 rigidly connected at one end to the blocks 134 and extending through an opening in a bracket 160 secured to its associated tubular component 70, 72. The free end of rods 158 extend through apertures in the brackets 160 and initially, the position of these arms 130 is adjusted by adjustment nuts 162.

Prior to use of the apparatus in the pipeline, arms 130 are adjusted through nuts 162 and the tension on spring 142 so that the three wheels 136 at the end of the arms in each carriage member will support the tubular members concentrically within the pipeline. The tension of spring 142 is adjusted to tightly engage its associated wheel 136 against the inner wall of the pipeline and the strength of the spring is such that it will support the entire weight of the sensor device in the event that the sensor rotates about the central axis of the pipeline so that this wheel 136 is on the bottom of the pipe. That is, should the entire weight of the sensor 20 rest on wheels 136 associated with the arms 130 biased by springs 142, the springs will not compass, and therefore the device will be accurately maintained concentrically within the pipeline. However, should an obstruction in the pipeline be passed, such as for example, a weld bead, which renders the inner diameter of the pipeline smaller than nominal, spring 142 will be subjected to additional forces, causing its associated arm 130 to pivot in a counterclockwise direction, as seen in FIG. 4, in order to permit the device to pass the obstruction.

The arms 130 of each of the carriage members 76 are arranged so that the wheels 136 associated therewith contact the inner wall of the pipeline 12 at points $x$, $y$ and $z$ respectively (FIG. 3) which lie in a common plane that extends perpendicularly to and intersects their associated tubular members 70, 72 at the points A, B and C so that it is those points which are held on the centerline of the pipeline as sensor unit 20 passes therethrough. As mentioned, it is critical that these points be maintained on the centerline when the measurements are taken from the strain gages in order to insure that the strain in rod 82 is proportional to the curvature in the pipeline in accordance with the equations set forth above.

Figure 10:
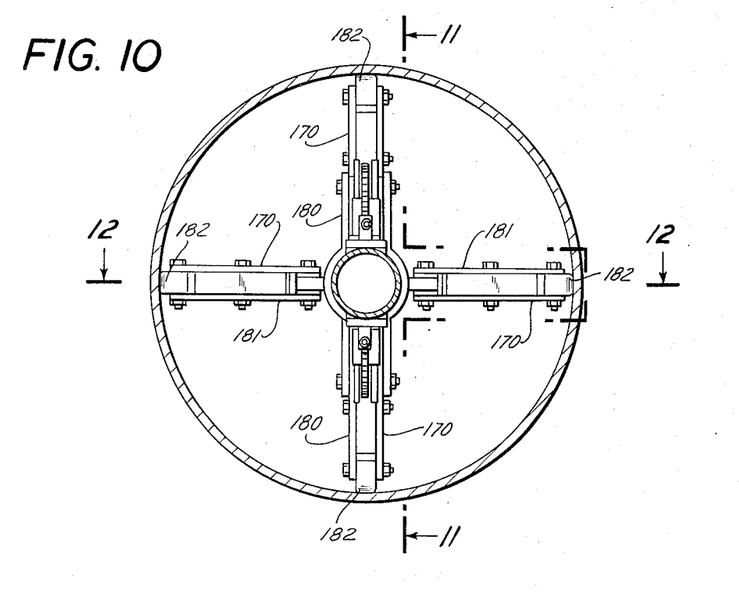
FIG. 10 is a sectional view, similar to FIG. 3, of another embodiment of the present invention.
Figure 12:
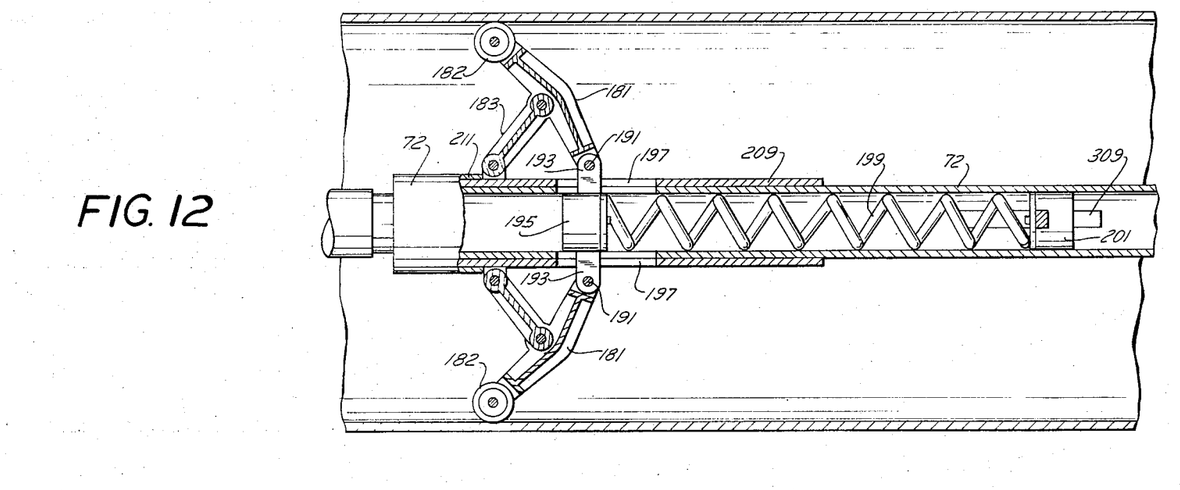
FIG. 12 is a sectional view taken along line 12—12 of FIG. 10.

FIGS. 10, 11 and 12 illustrate an alternative embodiment of the invention utilizing four arms 170 in each of the carriage members 76, in lieu of the three arm construction discussed above. Two of the arms 180, shown vertically positioned in FIG. 11 and two arms 181, vertically positioned in FIG. 12, carry wheels 182, braced with pivot arms 183, to hollow component 72. Arms 180 have pins 185 which pass through one end of reciprocating frame piece 184. The latter is slidably mounted between a pair of brackets 189, secured to tubular component 70 or 72, with the end thereof opposite pins 185 riding in slots 186, by means of pins 188.

In FIG. 12, it is seen that arms 181 are connected by pivot pins 191 to ears 193 which are in turn connected to a piston 195 and ride in opposed openings 197 in component 72. Piston 195 is urged to the left, as shown in FIGS. 11 and 12, by spring 199 which is held under compression by a spring end block 201. Block 201 is urged to the left when reciprocating pieces 184 are urged to the right, thereby to adjust the angular position of the arms 181, and the radial location of the rollers 136. For this purpose pulleys 203 are rigidly mounted on component 72, with chains 205 secured between the block 184, about pulleys 203 and connected to block 201 by adjustable chain terminals 207 which extend through openings 309 in component 72.

With this structure, component 70 may be reinforced around openings 197 by a rigid collar 209. Sleeve 211 provides additional support near the base of arms 183. The function of the four arms of the centering device depends upon the interplay of each pair of arms in the manner shown. Similar arrangements for transmitting force between the pair of arms may be used.

More than two longitudinal sensor bars 70, 72 may be used, provided additional angle sensor units 80 are provided. Under some circumstances, a part of the tractor device may function as one of the sensor bars, or where the connector cable 18 is not used and the tractor is positioned close to the bend in the conduit to be measured. It is understood that by suitably designing the proportions of the tractor, the unit may move through a bend of considerable curvature without rubbing or jamming against the conduit wall. In addition, it is noted that elements other than wheels and rollers may be used for propelling the apparatus over a conduit wall; for example, a tractor tread drive mechanism may be used to propel the tractor unit. In addition, relatively flat, elongated skids or skis may be placed at the end of arms 130 in addition to the rollers in order to permit the arms 130 to traverse an opening in the conduit. It is also noted that, with the embodiment of the carriage members 76 illustrated in FIG. 4, should an opening occur in pipeline 12, the upper arm 136 will be pivoted outwardly under the influence of spring 142. In order to limit the outward movement of the arm 130, a block 133 is provided at the end of member 148 to limit the pivotal movement of the associated arm. In addition, in either embodiment, wheels 136 may be provided with one waist clutch of conventional construction, to prevent unit 20 from rolling backwards in pipe 12 should cable 18 break.

Accordingly, it is seen that a relatively simple and inexpensive sensor unit is provided by which the curvature and strain in a pipeline can be accurately determined from a remote location. This represents a substantial improvement in the art in that the curvature of the pipe as it is being laid can be instantaneously determined so that if the strain in the pipeline is excessive, it can be immediately relieved by adjustment of the pipeline to prevent inadvertent failure of the pipeline. This system also permits a pipeline having a thinner wall to be used since the stresses in the pipeline can be controlled with the use of the sensor so that failure of the pipeline because of excessive curvature thereof during the laying operation can be avoided. Moreover, the system of the present invention can be used to determine the curvature in bores or conduits other than pipelines, for example, oil well bores or the like, since the sensor unit 80 actually measures the change of slope in the curved conduit, the reading taken by the strain gages can readily be converted to change in slope and radius of curvature in accordance with the above equations.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention.

What is claimed is:

1. The method of determining the change in slope of a bore comprising the steps of, supporting a pair of pivotally interconnected rigid components in said bore with the ends and pivotal interconnection therebetween located on the centerline of the bore, rigidly securing a flexible rod to said components with said rod extending through the pivotal interconnection between said components and detecting the strain in said rod at said pivotal interconnection whereby said strain is proportional to the change in slope between said supported components and the change in slope of said bore.

2. The method as defined in claim 1 including the step of pivotally interconnecting said components in tandem with a universal joint, whereby change in slope of said bore in any direction is detected.

3. The method as defined in laim 2 wherein said detecting step includes the step of detecting the strain in said rod along at least two planes located at 90° with respect to each other, to detect orthogonal components of the maximum strain in said rod.

4. The method as defined in claim 3 wherein said securing step includes the step of positioning said rod in a predetermined angular relation to said rigid components whereby the relationship between the location of said orthogonal strain components and the rigid components is determined.

5. The method as defined in claim 4 including the step of detecting the instantaneous angular configuration of said rigid components in said bore, whereby the instantaneous angular location of said orthogonal strain components is determined.

6. The method of determining curvature and strain in a pipeline comprising, the steps of, interconnecting a pair of elongated rigid components by a universal joint, said components each having a free end at the end thereof opposite to said universal joint, rigidly securing a flexible rod to said components with said rod extending through the universal joint, supporting the free ends of said components and said universal joint concentrically of said pipeline with the center of said component ends and the center of said universal joint on the centerline of the pipeline whereby the change in slope between said components at said universal joint is equal to the change in slope of said pipeline and substantially all bending strain at said joint caused by relative pivotal movement between said component occurs in said rod, and detecting the strain in said rod at said universal joint, said strain being proportional to the change in slope of said components and said pipeline and to the strain in said pipeline.

7. The method as defined in claim 6 wherein said detecting step comprises detecting the strain in said rod along at least two planes located at 90° with respect to ach other to detect orthogonal components of the maximum strain in said rod.

8. The method as defined in claim 7 wherein said securing step includes the step of positioning said rod in a predetermined angular relation to said rigid components whereby the relationship between the location of said orthogonal strain components and the rigid components is determined.

9. The method as defined in claim 8 including the step of detecting the instantaneous angular configuration of said rigid components in said bore, whereby the instantaneous angular location of said orthogonal strain components is determined.

10. The method as defined in claim 9 including the step of securing a generally frustoconical housing to one of said rigid components at said universal joint, with said housing opening towards and receiving the adjacent end of the other of said components thereby to limit the total permissible bending angle between said rigid components.

11. The method as defined in claim 10 including the step of moving said interconnected rigid components through said pipeline to a plurality of measuring stations to determine the change in slope of said pipeline at each of said stations.

12. Apparatus for determining the change in slope of a bore, which apparatus comprises, a pair of elongated rigid components, means for pivotally interconnecting said components in tandem relation, said components each having a free end opposite said pivotal connection, means for supporting the free ends of each of said components and the pivotal connection therebetween on the centerline of said bore, an elongated flexible rod having opposed ends respectively secured to said rigid components and extending through the center of said pivot means, and means for detecting the strain in said rod at said pivotal interconnection, whereby said strain is proportional to the change in slope between said rigid components and the change in slope of said bore.

13. The apparatus as defined in claim 12 wherein said means for pivotally interconnecting said rigid components comprises a universal joint whereby said components may pivot in all directions with respect to each other and the change in slope of said bore in any direction is detected.

14. The apparatus as defined in claim 13 wherein said means for detecting strain comprises means for detecting the strain in said rod along at least two planes located at 90° with respect to each other to detect orthogonal components of the maximum strain in said rod.

15. The apparatus as defined in claim 14 including means for securing said flexible rod in said components in a predetermined angular relation whereby the relationship between said orthogonal strain components and said rigid components is determined.

16. The apparatus as defined in claim 15 including means for detecting the instantaneous angular relation of said rigid components with respect to said bore whereby the instantaneous angular location of said orthogonal components is determined.

17. Apparatus for determining the curvature and strain in a pipeline, said apparatus comprising, a pair of hollow elongated tubular components having cross-sectional areas substantially less than the cross-sectional area of said pipeline, a universal joint operatively interconnecting said components in tandem relation, said components each having an end portion opposite said universal joint and being spaced equi-distant therefrom, an elongated flexible strain rod having opposed ends respectively rigidly secured to said rigid components and extending through the center of said universal joint whereby substantially all bending strain at said joint caused by relative pivotal movement between said components occurs, means for supporting said free end portions of each of said components and said universal joint in concentric relation to said pipeline and on the centerline thereof, whereby the change in slope between said components at said universal joint is equal to the change in slope of said pipeline, and means for detecting the strain in said rod at said universal joint, said strain being proportional to the change in slope of said components and said pipeline and to the strain in said pipeline.

18. Apparatus as described in claim 17 wherein said means for supporting said free end portions of said components and said universal joint comprises at least three separate carriage members mounted respectively on said tubular components adjacent said free end portions and said universal joint.

19. Apparatus as described in claim 18 wherein said carriage members each include a plurality of radially extending arms respectively mounted at one end to their associated tubular components and anti-friction means secured to the opposite ends of said arms for supporting said tubular components in said pipeline.

20. Apparatus as defined in claim 19 wherein the anti-friction means on the arms of the carriage members mounted adjacent the free end portions of said tubular members respectively lie in common planes extending perpendicularly to and intersecting their associated tubular members at points located equal distances from said universal joint, and the anti-friction means on the arms of the carriage member mounted adjacent the universal joint lie on a common plane extending perpendicular to the central axis of the tubular member to which their arms are connected and intersecting said universal joint at the center thereof whereby said points and the center of said joint are supported on the centerline of said pipeline.

21. The apparatus as defined in claim 20 wherein said arms are pivotally mounted on said tubular members and said carriage members include means for adjusting and maintaining the angular position of said arms with respect to their associated tubular members.

22. Apparatus as defined in claim 21 including means for continuously urging one of the arms in each of said carriage members outwardly about its pivotal mounting towards the inner wall of said pipeline.

23. Apparatus as defined in claim 21 wherein said means for detecting strain includes at least two strain gages secured to the periphery of said rod adjacent the center of said universal joint, with at least one strain gage located 90° away from the other of said strain gages thereby to detect orthogonal components of the maximum strain in said rod.

24. Apparatus as defined in claim 23 including means for securing said flexible rod to said components in a predetermined angular relation whereby the relationship between said orthogonal strain components and said rigid components is determinable.

25. Apparatus as defined in claim 24 including means for detecting the instantaneous angular relation of said rigid components with respect to said pipeline whereby the instantaneous angular location of said orthogonal components is determinable.

26. Apparatus as defined in claim 25 wherein said means for detecting the instantaneous angular relation of said rigid components comprises a variable resistance annular potentiometer having a gravity activated slide contact and mounted in a predetermined position in one of said tubular members whereby a predetermined signal is produced by said potentiometer at each angular position of its associated tubular member about the centerline of said pipeline.

27. Apparatus as defined in claim 25 including a frustoconical collar secured in axial alignment to one of said tubular members, adjacent said universal joint, and opening outwardly thereof to surround a portion of the adjacent end of the other of said rigid components to limit the relative bending movement between said components permitted by said universal joint.

28. Apparatus as defined in claim 25 wherein said anti-friction means each comprise a roller rotatably mounted on the free end of its associated arm.

29. Apparatus as defined in claim 25 including tractor means movable within said pipeline for moving and guiding the interconnected rigid components to predetermined positions within the pipeline, said tractor means including a frame, a plurality of traction elements, mounting means for mounting the traction elements relative to the frame to cause the elements to be urged against the inner walls of the pipeline, means for driving at least one of the traction elements to cause the tractor means to move within the pipeline and means for connecting the sensor unit to the tractor means.

* * * * *